US009459784B2

(12) United States Patent
Benko et al.

(10) Patent No.: US 9,459,784 B2
(45) Date of Patent: Oct. 4, 2016

(54) TOUCH INTERACTION WITH A CURVED DISPLAY

(75) Inventors: Hrvoje Benko, Seattle, WA (US); Andrew D. Wilson, Seattle, WA (US); Billy Chen, Bellevue, WA (US); Ravin Balakrishnan, Toronto (CA); Patrick M. Baudisch, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 783 days.

(21) Appl. No.: 12/344,411

(22) Filed: Dec. 26, 2008

(65) Prior Publication Data
US 2010/0023895 A1 Jan. 28, 2010

Related U.S. Application Data

(60) Provisional application No. 61/083,679, filed on Jul. 25, 2008.

(51) Int. Cl.
| | |
|---|---|
| G06F 3/048 | (2013.01) |
| G06F 3/0486 | (2013.01) |
| G06F 3/041 | (2006.01) |
| G06F 3/042 | (2006.01) |
| G06F 3/0488 | (2013.01) |

(52) U.S. Cl.
CPC ............ *G06F 3/0486* (2013.01); *G06F 3/041* (2013.01); *G06F 3/042* (2013.01); *G06F 3/0488* (2013.01); *G06F 3/04883* (2013.01); *G06F 2203/04808* (2013.01)

(58) Field of Classification Search
CPC ............ G06F 3/04883; G06F 3/0486; G06F 3/0488; G06F 3/041; G06F 3/042; G06F 2203/04808

USPC ......... 715/864, 863, 846, 850; 345/679, 680
See application file for complete search history.

(56) References Cited

U.S. PATENT DOCUMENTS

| | | |
|---|---|---|
| 4,311,468 A | 1/1982 | Kiel et al. |
| 4,645,459 A | 2/1987 | Graf et al. |

(Continued)

FOREIGN PATENT DOCUMENTS

| | | |
|---|---|---|
| EP | 1195637 | 4/2002 |
| FR | 2821168 | 8/2002 |

(Continued)

OTHER PUBLICATIONS

Grossman, Wigdor, and Balakrishnan, "Multi-Finger Gestural Interaction with 3D Volumetric Displays", Jul. 2005, UIST '04, vol. 6, Issue 2.*

(Continued)

*Primary Examiner* — Aaron Lowenberger
(74) *Attorney, Agent, or Firm* — Alin Corie; Sandy Swain; Micky Minhas

(57) ABSTRACT

Touch interaction with a curved display (e.g., a sphere, a hemisphere, a cylinder, etc.) is facilitated by preserving a predetermined orientation for objects. In an example embodiment, a curved display is monitored to detect a touch input on an object. If a touch input on an object is detected based on the monitoring, then one or more locations of the touch input are determined. The object may be manipulated responsive to the determined one or more locations of the touch input. While manipulation of the object is permitted, a predetermined orientation is preserved.

22 Claims, 10 Drawing Sheets

(56) References Cited

U.S. PATENT DOCUMENTS

| | | | |
|---|---|---|---|
| 5,315,692 A | 5/1994 | Hansen et al. | |
| 5,414,521 A | 5/1995 | Ansley | |
| 5,463,725 A * | 10/1995 | Henckel et al. | 715/776 |
| 5,852,450 A | 12/1998 | Thingvold | |
| 5,945,985 A | 8/1999 | Babin et al. | |
| 5,990,990 A | 11/1999 | Crabtree | |
| 6,008,800 A | 12/1999 | Pryor | |
| 6,016,385 A | 1/2000 | Yee et al. | |
| 6,027,343 A | 2/2000 | Ho | |
| 6,064,423 A | 5/2000 | Geng | |
| 6,100,862 A | 8/2000 | Sullivan | |
| 6,115,025 A * | 9/2000 | Buxton et al. | 345/659 |
| 6,124,685 A | 9/2000 | Toriu et al. | |
| 6,278,419 B1 | 8/2001 | Malkin | |
| 6,409,351 B1 | 6/2002 | Ligon | |
| 6,411,337 B2 | 6/2002 | Cove et al. | |
| 6,449,887 B1 | 9/2002 | Song | |
| 6,527,555 B1 | 3/2003 | Storm | |
| 6,720,956 B1 | 4/2004 | Honma | |
| 6,753,847 B2 | 6/2004 | Kurtenbach et al. | |
| 6,756,966 B2 | 6/2004 | Dirksen | |
| 6,773,262 B1 | 8/2004 | Blum | |
| 6,793,350 B1 | 9/2004 | Raskar | |
| 7,084,859 B1 | 8/2006 | Pryor | |
| 7,390,092 B2 | 6/2008 | Belliveau | |
| 7,466,843 B2 | 12/2008 | Pryor | |
| 7,535,489 B2 | 5/2009 | Nonaka et al. | |
| 7,710,391 B2 | 5/2010 | Bell et al. | |
| 8,066,378 B2 | 11/2011 | Lalley et al. | |
| 2002/0070277 A1 | 6/2002 | Hannigan | |
| 2003/0006973 A1 | 1/2003 | Omura | |
| 2003/0142144 A1* | 7/2003 | Balakrishnan et al. | 345/848 |
| 2004/0001111 A1* | 1/2004 | Fitzmaurice et al. | 345/848 |
| 2004/0184013 A1 | 9/2004 | Raskar et al. | |
| 2004/0260469 A1 | 12/2004 | Mizusawa | |
| 2005/0001920 A1 | 1/2005 | Endler | |
| 2005/0110964 A1 | 5/2005 | Bell et al. | |
| 2005/0162381 A1 | 7/2005 | Bell et al. | |
| 2005/0275628 A1 | 12/2005 | Balakrishnan et al. | |
| 2006/0007170 A1 | 1/2006 | Wilson et al. | |
| 2006/0017692 A1* | 1/2006 | Wehrenberg et al. | 345/156 |
| 2006/0125822 A1 | 6/2006 | Kurtenbach et al. | |
| 2006/0132501 A1 | 6/2006 | Nonaka et al. | |
| 2006/0167990 A1 | 7/2006 | Tobiasen | |
| 2006/0227303 A1 | 10/2006 | Matsubara et al. | |
| 2006/0227416 A1 | 10/2006 | Balu et al. | |
| 2007/0035513 A1 | 2/2007 | Sherrard et al. | |
| 2007/0152966 A1 | 7/2007 | Krah et al. | |
| 2007/0152984 A1 | 7/2007 | Ording et al. | |
| 2007/0159459 A1 | 7/2007 | Wang | |
| 2007/0183685 A1 | 8/2007 | Wada | |
| 2007/0229546 A1 | 10/2007 | Klassen et al. | |
| 2007/0247435 A1 | 10/2007 | Benko et al. | |
| 2007/0247439 A1* | 10/2007 | Daniel et al. | 345/173 |
| 2007/0257891 A1 | 11/2007 | Esenther et al. | |
| 2007/0271524 A1 | 11/2007 | Chiu et al. | |
| 2007/0279381 A1 | 12/2007 | Odell et al. | |
| 2008/0084400 A1 | 4/2008 | Rosenberg | |
| 2008/0088587 A1 | 4/2008 | Pryor | |
| 2008/0088593 A1 | 4/2008 | Smoot | |
| 2008/0109717 A1* | 5/2008 | Krauter | 715/255 |
| 2008/0150913 A1 | 6/2008 | Bell et al. | |
| 2008/0152297 A1 | 6/2008 | Ubillos | |
| 2008/0158145 A1 | 7/2008 | Westerman | |
| 2008/0165136 A1* | 7/2008 | Christie et al. | 345/173 |
| 2008/0179507 A2 | 7/2008 | Han | |
| 2008/0180399 A1 | 7/2008 | Cheng | |
| 2008/0189658 A1 | 8/2008 | Jeong et al. | |
| 2008/0211779 A1 | 9/2008 | Pryor | |
| 2009/0027381 A1* | 1/2009 | Lee | 345/419 |
| 2009/0027622 A1 | 1/2009 | Lalley et al. | |
| 2009/0040236 A1 | 2/2009 | Childress et al. | |
| 2009/0051671 A1 | 2/2009 | Konstas | |
| 2009/0059096 A1 | 3/2009 | Yamamoto et al. | |
| 2009/0167723 A1 | 7/2009 | Kwong et al. | |
| 2009/0189857 A1 | 7/2009 | Benko | |
| 2009/0189917 A1 | 7/2009 | Benko | |
| 2010/0020026 A1 | 1/2010 | Benko | |
| 2010/0182236 A1 | 7/2010 | Pryor | |
| 2010/0220895 A1* | 9/2010 | Koren et al. | 382/109 |
| 2010/0265178 A1 | 10/2010 | Benko | |
| 2011/0102319 A1 | 5/2011 | Lin et al. | |

FOREIGN PATENT DOCUMENTS

| | | |
|---|---|---|
| JP | 2001-021833 A | 1/2001 |
| JP | 2002-532795 A | 10/2002 |
| JP | 2003-009039 | 1/2003 |
| JP | 2003-035933 | 2/2003 |
| JP | 2005-099064 A | 4/2005 |
| JP | 2006-094458 | 4/2006 |
| JP | 2006-184573 A | 7/2006 |
| WO | 00/35200 A1 | 6/2000 |
| WO | WO2005/114624 | 12/2005 |
| WO | WO2005/119431 | 12/2005 |
| WO | 2007/136372 A1 | 11/2007 |

OTHER PUBLICATIONS

Kettner, S. et al.; "Direct Rotational Interaction with a Spherical Projection"; Proceedings of the Creativity & Cognition Symposium on Interaction: Systems, Practice and Theory; Nov. 16-19, 2004; Sydney, Australia.

Chan, L.W. et al.; "Gesture-Based Interaction for a Magic Crystal Ball"; 14$^{th}$ International Conference on ACM Virtual Reality Software and Technology; Nov. 5-7, 2007; Newport Beach, California.

Ricker, T.; "Apple Applies for Multi-Touch Mouse Patent"; Retrieved at http://www.engadget.com/2007/07/05/apple-applies-for-multi-touch-mouse-patent/; Jul. 5, 2007; pp. 1-5.

Christensen, B.; "Sensisphere Multitouch Hemisphere Display"; Retrieved at http://www.technovelgy.com/ct/Science-Fiction-News.asp?NewsNum=1560; Nov. 10, 2008; pp. 1-3.

Hinckley, et al.; "Touch-Sensing Input Devices"; CHI'99 Proceedings Conf. on Human Factors in Computing Systems; May 1999; 8 pages.

Balakrishnan, et al.; "The PadMouse: Facilitating Selection and Spatial Positioning for the Non-Dominant Hand"; CHI'98 Proceedings of 1998 ACM Conference on Human Factors in Computing Systems; Apr. 1998; pp. 9-16.

Han, J.; "Low-Cost Multi-Touch Sensing Through ted OALInternal Reflection"; UIST'05; Oct. 23-27, 2005; Seattle, Washington; pp. 115-118.

"Actuality Systems"; http://www.siggraph.org/s2002/exhibition/detail/400.html; 2002.

Balakrishnan; et al., "User Interfaces for Volumetric Displays", Mar. 2001. IEEE. pp. 37-45.

Buckminster, F.; "The Geoscope"; Critical Path 1981; http://www.well.com/user/abs/geoscope.html.

Chen et al.; "Flexible Active-Matrix Electronic Ink Display", 2003. Nature 423. p. 136.

Companje, R. et al.; "Globe4D, Time-Traveling with an Interactive Four-Dimensional Globe", MM'06, Oct. 23-27, 2006, Santa Barbara, California, USA. 2 Pages.

Dietz et al.; "DiamondTouch: A Multi-User Touch Technology", 2001, ACM UIST. pp. 219-226.

Fitzmaurice et al.; "Sentient Data Access via a Diverse Society of Devices". 2003. ACM Queue. pp. 53-62.

Fuller, B.; "The Geoscope"; from Education Automation, http://www.vterrain.org/Misc/geoscope.html; 1962.

"Global Imagination"; http://www.globalimagination.com; downloaded Jan. 15, 2008.

Grossman et al.; "The Design and Evaluation of Selection Techniques for 3D Volumetric Displays", 2006. ACM UIST. pp. 3-12.

Hinckley et al.; "New Applications for the Touchscreen in 2D and 3D Medical Imaging Workstations"; Proceedings of SPIE Medical Imaging '95; Feb. 1995.

"iBall+"; http://www.audiovisualizers.com/library/store/iball/iball.htm; downloaded Jan. 16, 2008.

(56) References Cited

OTHER PUBLICATIONS

Kruger et al.; "How People Use Orientation on Tables: Comprehension, Coordination and Communication", 2003, ACM SIGGROUP Conference on Supporting Group Work. pp. 369-378.
Leary; "Video Projections on a Globe Make Planetary Data Click"; http://www.nytimes.com/2006/06/13/science/13sphe.html?_r=4&adxnnl=1&oref=slogin&adxnnlx=1195256110-XujoB4n89dZC5/zH5rkocQ&oref=slogin&oref=slogin; Jun. 13, 2006.
Marchese et al.; "A Projected Hemispherical Display with a Gestural Interface", 2006, ACM SIGGRAPH Research Posters.
Matsushita et al.; "HoloWall: Designing a Finger, Hand, Body, and Object Sensitive Wall", 1997, ACM UIST. pp. 209-210.
Morris et al.; "Beyond 'Social Protocols': Multi-User Coordination Policies for Co-located Groupware". 2004. ACM CSCW, pp. 262-265.
"The Omniglobe: A Self-Contained Spherical Display System" Emerging Technologies—SIGGRAPH 2003; http://www.siggraph.org/s2003/conference/etech/omniglobe.html; 2003.
"OmniGlobe Technology"; ARC Science Simulations; http://www.arcscience.com/systemDetails/omniTechnology.html; downloaded Jan. 16, 2008.
"PufferSphere" by Pufferfish; http://www.pufferfishdisplays.co.uk; downloaded May 13, 2008.
Rekimoto; "SmartSkin: An Infrastructure for Free-hand Manipulation on Interactive Surfaces", 2002. ACM CHI. pp. 113-120.
"Science on a Sphere"; http://sos.noaa.gov; downloaded Jan. 16, 2008.
Scott et al.; "Territoriality in Collaborative Tabletop Workspaces", 2004. ACM CSCW, pp. 294-303.
Shen et al.; "DiamondSpin: An Extensible Toolkit for Around-the-Table Interaction", ACM, CHI. pp. 167-174.
Shibano et al.; "CyberDome: PC Clustered Hemi Spherical Immersive Projection Display", In Proc. of the 2003 International Conference on Artificial Reality and Telexistence (ICAT 2003), Tokyo, Japan, Dec. 3-5, 2003, pp. 1-7.
Shoemake; "Animating Rotation with Quaternion Curves", 1985. ACM SIGGRAPH. pp. 245-253.
Shoemake; "ARCBALL: A User Interface for Specifying Three-Dimensional Orientation Using a Mouse", 1992. Graphics Interface. pp. 151-156.
Ushida et al.; "i-ball2: An Interaction Platform with a Crystal-ball-like Display for Multiple Users", 2003. International Conference on Artificial Reality and Teleexistence.
"The Videoglobe"; http://www.videoinmotion.com/VideoGlobePage.htm; downloaded Jan. 16, 2008.
Wilson; "TouchLight: An Imaging Touch Screen and Display for Gesture-Based Interaction", 2004. ICMI Conference on Multimodal Interfaces. pp. 69-76.
Wilson; "PlayAnywhere: A Compact Tabletop Computer Vision System", 2005. ACM UIST. pp. 83-92.
Wu, et al.; "Multi-Finger and Whole Hand Gestural Interaction Techniques for Multi-User Tabletop Displays". 2003, ACM UIST. pp. 193-202.
Yang et al.; "PixelFlex: A Reconfigurable Multi-Projector Display System", Proceedings of the conference on Visualization '01, Oct. 21-26, 2001, San Diego, California, 9 Pages.
Yip, et al.; "Visualising Internet Traffic Data with Three-Dimensional Spherical Display", proceedings of the 2005 Asia-Pacific symposium on Information 4isualization—vol. 45, Sydney, Australia, Year of Publication: 2005, pp. 153-158.
PCT Patent Application PCT/US2008/088124; International Search Report and Written Opinion of Jun. 23, 2009; 11 pages.
PCT Patent Application PCT/US2009/051659; International Search Report and Written Opinion dated Mar. 2, 2010; 12 pages.
EP Patent Application 08871181.7; Extended European Search Report of Dec. 20, 2010; 11 pages.
CN Patent Application 200880125597.5; First Office Action dated Aug. 26, 2011; 8 pages.
CN Patent Application 200880125597.5; Second Office Action dated Feb. 13, 2012; 6 pages.
Benko, H. et al.; "Sphere: Multi-Touch Interactions on a Spherical Display"; ACM Conference Proceedings UIST 2008; Oct. 22, 2008; pp. 77-86.
EP Patent Appln. 09801053.1; Extended European Search Report dated Nov. 8, 2011.
CN Patent Application 200980130059.X; First Office Action dated Dec. 12, 2012; 9 pages.
Liang, et al., "JDCAD: A Highly Interactive 3D Modeling System", in Computer and Graphics, vol. 18, No. 4, 1994, pp. 499-506.
Second Office Action for Chinese Patent Application No. 200980130059.x, Mailed Date: Aug. 6, 2013, 6 pages.
Notice of Allowance for Chinese Patent Application No. 200980130059.x, Mailed Date: Feb. 13, 2014, 9 pages.
Office Action for European Patent Application No. 09801053.1, Mailed Date: Nov. 25, 2011, 1 page.
Notice of Rejection for Japanese Patent Application No. 2010-544301, Mailed Date: Jan. 18, 2013, 4 pages.
Extended European Search Report for European Patent Application No. 08871181.7, Mailed Date: Dec. 20, 2010, 11 pages.
Office Action for European Patent Application No. 08871181.7, Mailed Date: Jan. 7, 2011, 1 page.
Office Action for European Patent Application No. 08871181.7, Mailed Date: Sep. 21, 2011, 5 pages.
Office Action for European Patent Application No. 08871181.7, Mailed Date: May 17, 2013, 5 pages.
Final Office Action for Japanese Patent Application No. 2010-544301, Mailed Date: May 24, 2013, 5 pages.
Decision of Refusal for Japanese Patent Application No. 2010-544301, Mailed Date: Oct. 15, 2013, 6 pages.
Response to First Office Action for Chinese Patent Application No. 200980130059.x, Mailed Date: Dec. 12, 2012, Filed Date: Apr. 8, 2013, 13 pages.
Response to Office Action for European Patent Application No. 09801053.1, Mailed Date: Nov. 25, 2011, Filed Date: Jun. 4, 2012, 20 pages.
Response to Office Action for European Patent Application No. 08871181.7, Mailed Date: Jan. 7, 2011, Filed Date: Jul. 14, 2011, 18 pages.
Response to Office Action for European Patent Application No. 08871181.7, Mailed Date: Sep. 21, 2011, Filed Date: Nov. 4, 2011, 4 pages.
Response to Official Communication for European Patent Application No. 08871181.7, Mailed Date: May 17, 2013, Filed Date: Sep. 6, 2013, 16 pages.
Notice of Appeal and Amendment for Japanese Patent Application No. 2010-544301, Filed Date: Feb. 13, 2014, 15 pages.
Bowman, D.A., Kruijff, E., Laviola, J.J., and Poupyrev, I.; 3D User Interfaces: Theory and Practice (2004), Ch. 3.2.3 "Visual Display Device Types," Addison-Wesley, Boston, pp. 40-59.
PCT/US2008/088124, Including International Search Report and Written Opinion.
PCT/US2009/051659, Including International Search Report and Written Opinion.
Non-Final Office Action, From U.S. Appl. No. 12/344,377, Mailed: Jul. 26, 2011.
Response to the Jul. 26, 2011 Non-Final Office Action, From U.S. Appl. No. 12/344,377, filed Oct. 26, 2011.
Applicant Initiated Interview Summary,From U.S. Appl. No. 12/344,377, Mailed: Nov. 1, 2011.
Final Office Action, From U.S. Appl. No. 12/344,377, Mailed: Jan. 3, 2012.
Response to the Jan. 3, 2012 Final Office Action, From U.S. Appl. No. 12/344,377, filed Feb. 16, 2012.
Non-Final Office Action, From U.S. Appl. No. 12/344,377, Mailed: Aug. 14, 2013.
Response to the Aug. 14, 2013 Non-Final Office Action, From U.S. Appl. No. 12/344,377, filed Dec. 4, 2013.
Notice of Allowance, From U.S. Appl. No: 12/344,377, Mailed: Mar. 31, 2014.
Notice of Allowance, From U.S. Appl. No. 12/344,377, Mailed: Nov. 21, 2014.

(56) References Cited

OTHER PUBLICATIONS

Non-Final Office Action, From U.S. Appl. No. 12/425,408, filed Apr. 17, 2009, Mailed: Oct. 14, 2011.
Response to the Oct. 14, 2011 Non-Final Office Action, From U.S. Appl. No. 12/425,408, filed Dec. 29, 2011.
Final Office Action, From U.S. Appl. No. 12/425,408, Mailed: Mar. 15, 2012.
Response to the Mar. 15, 2012 Final Office Action, From U.S. Appl. No: 12/425,408, filed Jul. 2, 2012.
Notice of Allowance, From U.S. Appl. No. 12/425,408, Mailed: Oct. 3, 2012.
Notice of Allowance, U.S. Appl. No. 12/425,408, Mailed: Nov. 16, 2012.
First Office Action, From Chinese Patent Application No. 200980130059.X, filed Jul. 29, 2009, Mailed: Dec. 12, 2012.
Response to the First Office Action, From Chinese Patent Application No. 200980130059.X, filed Apr. 3, 2013.
Second Office Action, From Chinese Patent Application No. 200980130059.X, Mailed: Aug. 3, 2013.
Response to the Second Office Action, From Chinese Patent Application No. 200980130059.X, filed Oct. 18, 2013.
Notice of Allowance, From Chinese Patent Application No. 200980130059.X, Mailed: Feb. 27, 2014.
Communication Pursuant to Rules 70(2) and 70a(2), From European Patent Application No. 09801053.1, filed Jul. 24, 2009, Mailed: Nov. 25, 2011.
Extended European Search Report, From European Patent Application No. 09801053.1, Mailed: Nov. 2011.
Response to the Communication Pursuant to Rules 70(2) and 70a(2), From European Patent Application No. 09801053.1 Mailed: Jun. 5, 2012.
First Office Action, From Chinese Patent Application No. 200880125597.5, Filed: Dec. 23, 2008, Mailed: Aug. 26, 2011.
First Office Action From Chinese Patent Application No. 200880125597.5, filed Dec. 22, 2011.
Second Office Action, From Chinese Patent Application Number: 200880125597.5, Mailed: Feb. 13, 2012.
Response to the Second Office Action, From Chinese Patent Application No. 200880125597.5, filed Apr. 11, 2012.
Communication Pursuant to Rules 70(2) and 70a(2), From European Patent Application No. 08871181.7, Mailed: Jan. 7, 2011.
Response to the Communication Pursurant to Rules 70(2) and 70a(2), From European Patent Application No. 08871181.7, filed Jul. 21, 2011.
Office Action, From European Patent Application No. 08871181.7, Mailed: Sep. 21, 2011.
Office Action, From European Patent Application Number: 08871181.7, Mailed: May 17, 2013.
Office Action Response, From European Patent Application Number: 08871181.7, filed Sep. 9, 2013.
Oral Hearing Summons, From European Patent Application No. 08871181.7, Mailed: May 17, 2013.
Response to the Oral Hearing Summons, From European Patent Application No. 08871181.7, filed Dec. 12, 2014.
Non-Final Office Action, From Japanese Patent Application No. 2010-544301, filed Dec. 23, 2008, Mailed: Feb. 28, 2013.
Response to the Non-Final Office Action, From Japanese Patent Application No. 2010-544301, filed May 7, 2013.
Final Office Action, From Japanese Patent Application No. 2010-544301, Mailed: Jul. 4, 2013.
Non-Final Office Action, From U.S. Appl. No. 12/122,736, filed May 19, 2008, Mailed: Jul. 11, 2011.
Response to the Jul. 11, 2011 Non-Final Office Action, From U.S. Appl. No. 12/122,736, filed Dec. 7, 2011.
Non-Final Office Action, From U.S. Appl. No. 12/122,736, Mailed: Feb. 2, 2012.
Response to the Feb. 2, 2012 Non-Final Office Action, From U.S. Appl. No. 12/122,736, filed Jun. 1, 2012.
Non-Final Office Action, From U.S. Appl. No. 12/122,736, Mailed: Oct. 3, 2012.
Response to the Oct. 3, 2012 Non-Final Office Action, From U.S. Appl. No. 12/122,736, filed Mar. 31, 2013.
Final Office Action, From U.S. Appl. No. 12/122,736, Mailed: Apr. 18, 2013.
Response to the Apr. 18, 2013 Final Office Action, from U.S. Appl. No. 12/122,736, filed Sep. 18, 2013.
Non-Final Office Action, From U.S. Appl. No. 12/122,736, Mailed: Nov. 29, 2013.
Response to the Nov. 29, 2013 Non-Final Office Action, From U.S. Appl. No. 12/122,736, filed Apr. 29, 2014.
Response to the Aug. 1, 2014 Final Office Action, From U.S. Appl. No. 12/122,736, filed Jan. 30, 2015.
Non-Final Office Action, From U.S. Appl. No. 12/122,745, filed May 19, 2008, Mailed: Jun. 11, 2011.
Response to the Jun. 11, 2011 Non-Final Office Action, From U.S. Appl. No. 12/122,745, filed Nov. 7, 2011.
Response to the Jan. 31, 2012 Non-Final Office Action, From U.S. Appl. No. 12/122,745, filed May 31, 2012.
Non-Final Office Action, From U.S. Appl. No. 12/122,745, Mailed: Aug. 15, 2012.
Response to the Aug. 15, 2012 Non-Final Office Action, From U.S. Appl. No. 12/122,745, filed Feb. 5, 2013.
Final Office Action, From U.S. Appl. No. 12/122,745, Mailed: Apr. 19, 2013.
Response to the Apr. 19, 2013 Final Office Action From U.S. Appl. No. 12/122,745, filed Sep. 19, 2013.
Non-Final Office Action, From U.S. Appl. No. 12/122,745, Mailed: Nov. 26, 2013.
Response to the Nov. 26, 2013 Non-Final Office Action, From U.S. Appl. No. 12/122,745, filed Apr. 28, 2014.
Notice of Allowance, From U.S. Appl. No. 12/122,745, Mailed: Jul. 7, 2014.
Voluntary Amendment filed Mar. 25, 2013 from Japan Patent Application No. 2011-520221, 17 pages.
Notice of Allowance mailed Oct. 6, 2013 from Japan Patent Application No. 2011-520221, 8 pages.
International Preliminary Report on Patentability mailed Mar. 2, 2010 from PCT Patent Application No. PCT/US2009/051659, 6 pages.
Applicant Initiated Interview Summary mailed Dec. 29, 2011 for U.S. Appl. No. 12/425,408, 3 pages.
Final Office Action mailed Aug. 1, 2014 from U.S. Appl. No. 12/122,736, 21 pages.
Non-Final Office Action mailed May 20, 2015 from U.S. Appl. No. 12/122,736, 18 pages.
International Preliminary Report on Patentability mailed Jun. 23, 2009 from PCT Patent Application No. PCT/US2008/088124, 5 pages.
Notice of Allowance mailed Jun. 5, 2012 from Chinese Patent Application No. 200880125597.5, 4 pages.
Response filed Nov. 4, 2011 to Office Action for EP Patent Application 08871181.7 dated Sep. 21, 2011, 5 pages.
Minutes mailed Feb. 6, 2015 from European Patent Application No. 08871181.7, 24 pages.
Notice of Allowance mailed Feb. 11, 2015 from European Patent Application No. 08871181.7, 51 pages.
Amendment and Appeal filed Feb. 13, 2014 from Japanese Patent Application No. 2010-544031, 15 pages.
Notice of Allowance mailed Jan. 6, 2015 from Japanese Patent Application No. 2010-544031, 6 pages.
Response to Final Office Action filed Feb. 13, 2014 from Japanese Patent Application No. 2010-544301, 15 pages.
Notice of Allowance mailed Aug. 14, 2015 from U.S. Appl. No. 121344,377, 9 pages.
U.S. Appl. No. 61/023,433, filed Jan. 25, 2008, entitled "Touch Sensing for Curved Displays," 28 pages.
U.S. Appl. No. 61/023,434, filed Jan. 25, 2008, entitled "Projection of Graphical Objects on irregular Displays," 32 pages.
U.S. Appl. No. 61/083,679, filed Jul. 25, 2008, entitled "Touch Interaction with a Curved Display," 38 pages.

(56) References Cited

OTHER PUBLICATIONS

Response filed Nov. 19, 2015 to the Non-Final Office Action mailed May 20, 2015 for U.S. Appl. No. 121122,736, 14 pages.
Final Office Action mailed Dec. 17, 2015 from U.S. Appl. No. 12/122,736, 20 pages.
Response filed Jun. 17, 2016 to the Final Office Action mailed Dec. 17, 2015 from U.S. Appl. No. 12/122,736, 16 pages.
Non-Final Office Action mailed Jun. 30, 2016 from U.S. Appl. No. 12/122,736, 16 pages.
First Office Action mailed May 27, 2016 from China Patent Application No. 201410145785.1, 10 pages.

\* cited by examiner

| Object Behavioral Auto-Rotation Unit [FIGS. 6A & 6B] 502 | Tether Behavioral Unit [FIGS. 7A & 7B] 504 |

TOUCH INTERACTION WITH A CURVED DISPLAY

CROSS-REFERENCE TO RELATED APPLICATION

This Nonprovisional U.S. patent application claims the benefit of U.S. Provisional Patent Application No. 61/083,679, which was filed 25 Jul. 2008 and entitled "Touch Interaction with a Curved Display". U.S. Provisional Patent Application No. 61/083,679 is hereby incorporated by reference in its entirety herein.

BACKGROUND

Visual output from computers and other electronic devices has historically been presented on flat screens. Even as cathode ray tube (CRT) monitors gave way to liquid crystal displays (LCDs) over the last few years, the screens have remained flat. User interaction with such flat screens was originally enabled at least primarily by way of the keyboard, which derived from the pre-existing typewriter. In the 1970s and 1980s, graphical user interface (GUI) technologies enabled mice and other pointer-type devices to be used for input.

When a pointer-type device is utilized for input, a user manipulates the device to move a pointer around a display screen. Typically, functionality is activated with the device by clicking on a given screen position, such as on an icon or a button. With the increased popularity of user interfaces that involve pointing and clicking, touch screen interfaces were developed. With a touch screen, a user may activate functionality by physically touching and/or pressing on a given screen position. However, such touch screens were still flat.

Recently, however, some curved displays have been created. For example, spherical displays of one kind or another have been developed. These spherical displays are especially employed in promotional environments or for the display of three-dimensional (3D) data. Spherical displays can offer an unobstructed 360° field-of-view to multiple users. This enables viewers to explore different perspectives of the displayed data by physically moving around the display.

Viewers can use the spherical nature of the display, their physical body position and orientation, and additional cues from the surrounding environment to aid them in spatially finding and understanding the data that is being displayed on a spherical surface. The characteristics of a display in a spherical form factor can afford interesting usage scenarios that go beyond what is possible with the more prevalent flat displays. Spherical displays also offer diverse interaction challenges. Unfortunately, conventional user interface (UI) technologies are rooted in traditional flat displays. As a result, conventional UI technologies fail to take advantage of the interesting usage scenarios and fail to address the diverse interaction challenges of curved displays.

SUMMARY

Touch interaction with a curved display (e.g., a sphere, a hemisphere, a cylinder, etc.) is facilitated by preserving a predetermined orientation for objects. In an example embodiment, a curved display is monitored to detect a touch input on an object. If a touch input on an object is detected based on the monitoring, then one or more locations of the touch input are determined. Responsive to the determined one or more locations of the touch input, the object is manipulated. While manipulation of the object is permitted, a predetermined orientation is preserved.

Example implementations include those that are directed to an object behavioral auto-rotation mechanism and those that are directed to a tether behavioral mechanism. For an example implementation of an object behavioral auto-rotation mechanism, an object behavioral auto-rotation unit maintains an object in a predetermined orientation as a user moves the object around a curved display. For an example implementation of a tether behavioral mechanism, a tether behavioral unit returns an object to a predetermined orientation after a user has manipulated the object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other systems, methods, devices, media, apparatuses, arrangements, and other example embodiments are described herein.

BRIEF DESCRIPTION OF THE DRAWINGS

The same numbers are used throughout the drawings to reference like and/or corresponding aspects, features, and components.

FIG. 5 is a block diagram of an interaction unit having two example units: an object behavioral auto-rotation unit and a tether behavioral unit.

DETAILED DESCRIPTION

As explained herein above, conventional UI technologies are rooted in traditional flat displays. Consequently, they fail to take advantage of the interesting usage scenarios of curved displays, and they also fail to address the diverse interaction challenges of curved displays. In contrast, certain embodiments that are described herein provide a set of touch interaction mechanisms and techniques that facilitate interaction and collaboration around a curved display. Approaches for direct touch interaction include those that address dragging, scaling, rotating, and other object manipulations on a curved display. Additional approaches provide for gestural interactions and implement touch UI concepts that accommodate the curved nature of the visual interface. Example embodiments and implementations are described further herein below.

Figure 1:
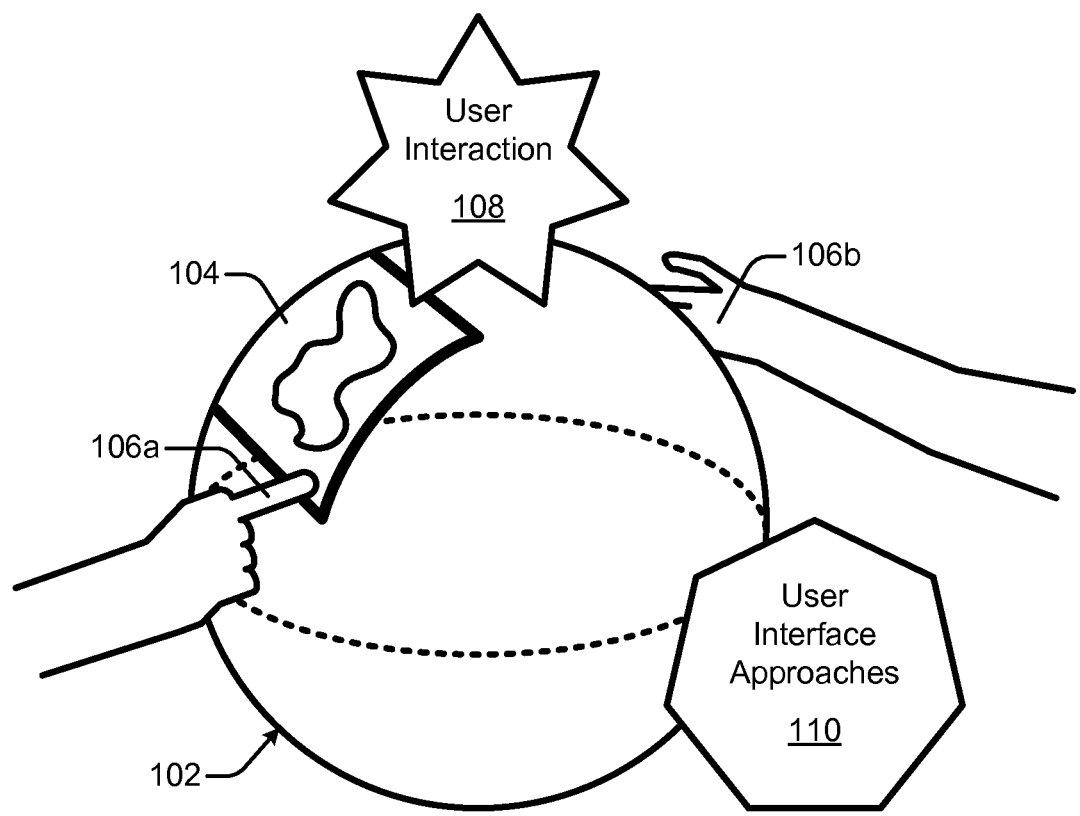
FIG. 1 illustrates an example user interaction environment for a curved display.

FIG. 1 illustrates an example UI environment 100 for a curved display 102. As illustrated, UI environment 100 includes curved display 102, an object 104, and multiple members 106. More specifically, object 104 is presented on curved display 102. Two members 106a and 106b are shown interacting with curved display 102. The elliptical shape formed from the dotted line indicates that curved display 102 is three-dimensional.

Generally, enabling user interaction on a curved surface involves the implementation of basic operations such as selection, dragging, rotation, scaling, and so forth. It may further entail providing support for browsing, task switching, and so forth. Each object (e.g., photo, video, etc.) can be independently dragged, rotated, and scaled. As with most touch-sensitive applications, selection of an object is implicitly triggered by a touch contact that lands on that object. Touch contacts that land on a video object act as a simple playback toggle—a touch contact starts the video playback if the video is paused or stops it if the video is running.

For example embodiments, the displayed elements (e.g., objects) of curved display 102 may be manipulated by members 106. Members 106 may be a finger or fingers, a hand or hands, a palm or palms, combinations thereof, and so forth. Members 106 may belong to the same or to different users. Although object 104 is shown as a photo or video, objects 104 may be any displayable element (e.g., web pages, textual documents, spreadsheets, raw data or images, combinations thereof, etc.).

Also, although curved display 102 is shown as a sphere, it may alternatively be cylindrical, cuboidal, hemispherical, a combination thereof, and so forth. Although the curved displays 102 that are illustrated in the drawings are spheres and are frequently described herein as being spherical, this is by way of example only. It should be understood that the principles and interactions explained herein are applicable to curved displays 102 generally.

User interactions 108 may include, for example, many different types of touches. The touches may vary by size, duration, location, movement, combinations thereof, and so forth. User interactions 108 may also include gestures, postures, combinations thereof, and so forth. These user interactions 108 may be defined and/or combined to enable different UI approaches 110, such as UI techniques and mechanisms. Different UI approaches 110 are described herein to take advantage of the properties of curved displays and/or to accommodate unusual characteristics of curved displays. Such properties and characteristics are described below.

Non-flat interactive displays have several properties that differ from their flat counterparts. Different interaction concepts may therefore be applied to curved displays. In particular, curved displays have the following three example inherent difficulties. First, the display surface is not a traditional Euclidian space, and it does not easily map into a flat space. This makes traditional flat interactions, such as a 2D translation, difficult. Second, the movement of visual elements around the surface can result in potentially awkward orientations for the displaced elements, including with regard to the viewpoints of multiple collaborators who may surround the curved display. Third, a user may be limited to seeing at most one hemisphere because data or other objects that are located on the other side (e.g., the opposite hemisphere) are currently invisible to the user due to the curvature of the display.

Curved displays intrinsically possess a number of other differentiating characteristics. For example, they do not have a natural "master user" position. Each user may instead be afforded an egalitarian user experience. Also, the content that is visible to each user changes with their height and position. Moreover, as a user changes their height and position, a spherical display can seem to smoothly transition between a vertical and a horizontal surface.

As a user moves around a curved display, it appears to be borderless, yet it is actually finite. It also becomes apparent that there are no natural orientation landmarks. In practice, however, the top (or "north pole" for a spherical display) may be perceived to be the strongest natural landmark for a curved display. Additionally, because a user is typically limited to seeing at most one-half of a curved display, other areas of the curved display offer pseudo-privacy. In other words, what one user is viewing in one hemisphere is relatively obstructed from the vision of other users that are viewing the opposite hemisphere.

A set of multi-touch interaction mechanisms (or features) and techniques for curved displays that facilitate interaction and collaboration around curved displays are introduced below following the description of FIG. 2. Two example embodiments are described herein below with particular reference to the units of FIG. 5. These two example embodiments are described in greater detail with particular reference to FIGS. 6A/6B and 7A/7B, respectively.

Figure 2:
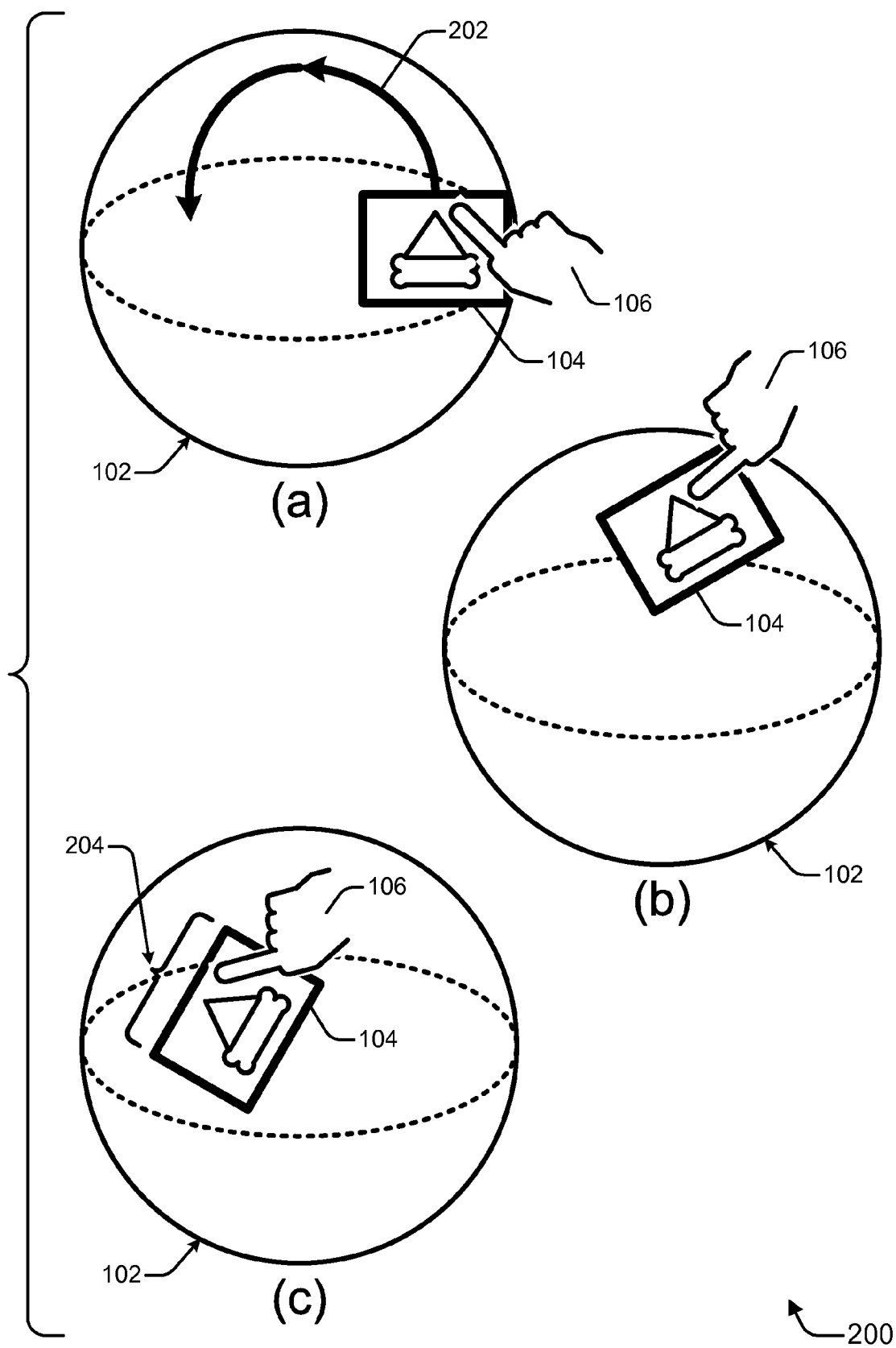
FIG. 2 depicts a straightforward approach to dragging an object around a curved display that may be operated by touch.

FIG. 2 depicts a straightforward approach 200 to dragging an object 104 around a curved display 102 that may be operated by touch. Approach 200 has three portions: portion (a), which is the top third of the figure; portion (b), which is the middle third of the figure; and portion (c), which is the bottom third of the figure. As illustrated, approach 200 includes, in addition to curved display 102 and object 104, a member 106, a path 202, and an orientation 204.

Path 202 is shown in portion (a), and it represents a path over which object 104 is dragged by member 106. Member 106 touches object 104 and drags it up a first side toward the top of curved display 102 and then down a second side of curved display 102. Portion (b) shows object 104 during the dragging along path 202 as it "ascends" the first side. Portion (c) shows object 104 at the end of the dragging along path 202.

Orientation 204 of object 104 is indicated in portion (c) at the end of the dragging along path 202. This orientation 204 is slanted inasmuch as users who wish to view object 104 in a "natural" orientation would be forced to tilt their heads, possibly at an awkward or uncomfortable angle, without changing the angle of object 104. In other words, dragging an object 104 around a curved display 102 with a default unassisted behavior may result in a difficult object orientation as shown in portion (c).

Thus, enabling a user to drag an object around a curved display in a user-friendly manner is not as straightforward as it may seem at first. A difficulty that is apparent from FIG. 2 and related text is that the natural orientation of objects 104 can be unintentionally changed in a manner that is visually unappealing. Thus, curved displays entail a number of properties that create UI difficulties.

To at least ameliorate or otherwise address one or more of these described difficulties, characteristics, and/or properties of curved displays, certain example embodiments entail the implementation of UI approaches that are tailored to curved displays. For example, interaction techniques and user interface mechanisms can facilitate the multi-touch manipulation of displayed objects on curved surfaces. These approaches can enable easier collaboration between multiple users by exploiting the different characteristics of curved surfaces.

Generally, example UI approaches are directed to preserving a predetermined orientation as objects are manipulated on a curved display. More specifically, an example UI approach involves maintaining objects in a predetermined orientation in a substantially "continuous" fashion. In an example implementation thereof, an object auto-rotation behavior entails using the top of a, e.g., spherical display as its natural orientation landmark and automatically orienting displayed objects with respect to the top. Another example UI approach involves returning an object to its tether position when the object is not currently being manipulated. In an example implementation, a tether behavior entails enabling an object to be freely manipulated, but upon a user's release of the object, the object is returned to its natural orientation state on the curved display (e.g., upright around a spherical display).

Figure 3:
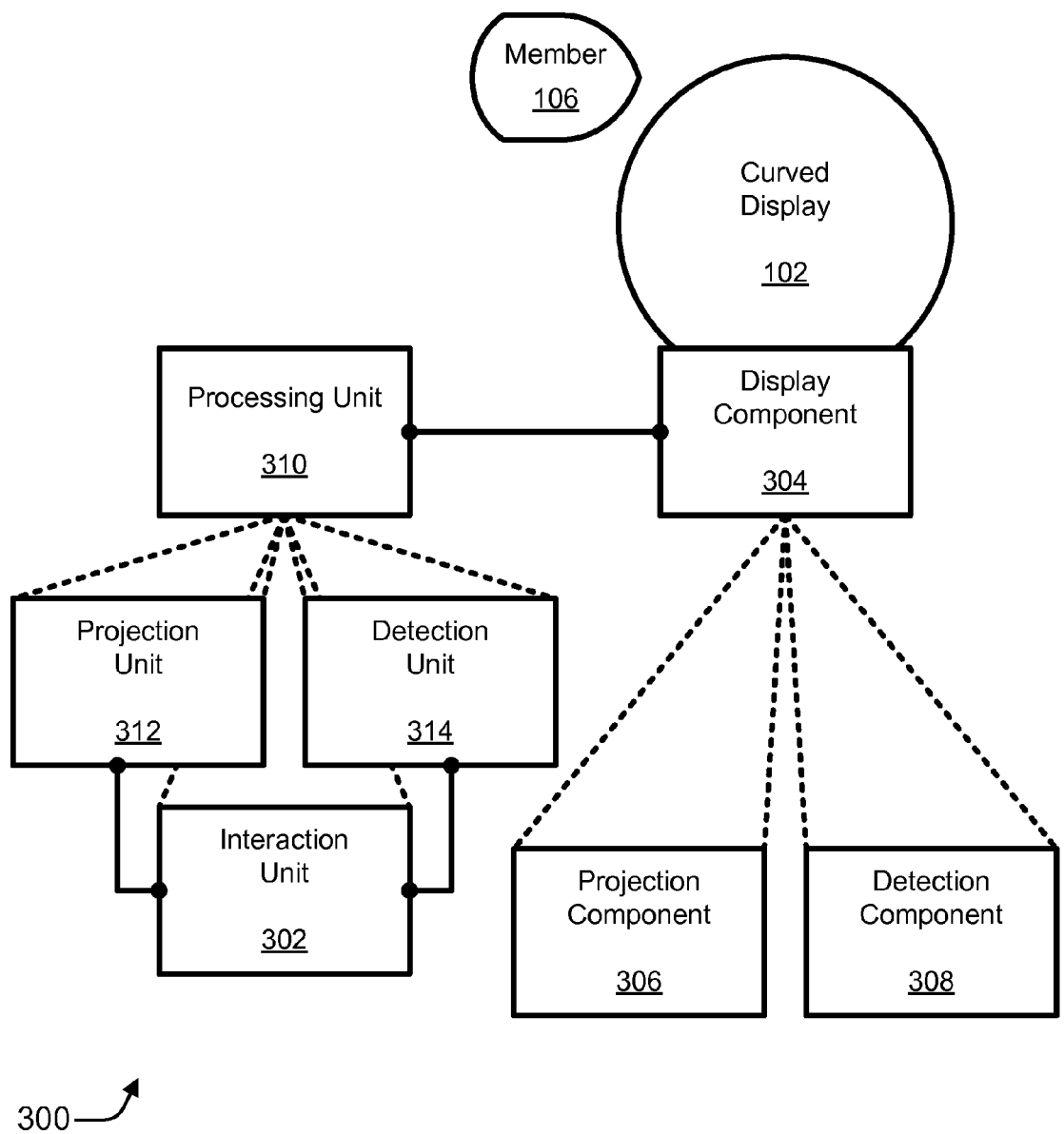
FIG. 3 is a block diagram of an example device having a curved display and the capability to enable interaction responsive to touch input via an interaction unit.

FIG. 3 is a block diagram of an example device 300 having a curved display 102 and the capability to enable interaction responsive to touch input via an interaction unit 302. As illustrated, device 300 includes curved display 102, a display component 304, and a processing unit 310. Display component 304 includes a projection component 306 and a detection component 308. Processing unit 310 includes a projection unit 312, a detection unit 314, and interaction unit 302. A member 106 is shown in proximity to curved display 102.

In example embodiments, curved display 102 may be any type of curved display having an interior and an exterior. Curved display 102 may have a diffuse surface for displaying images projected thereon by projection component 306. Examples for curved display 102 include, but are not limited to, spheres, cylinders, hemispheres, cuboids, combinations thereof, and so forth. In example implementations, curved display 102 at least partially encloses a space. It may also completely enclose a space, such as with a complete sphere or cuboid or a "solid" cylinder. Alternatively, it may partially enclose a space, such as with an open hemisphere or a cylinder with an open flat end. Other alternatives may also be implemented.

In an example embodiment, display component 304 is at least primarily a hardware component of device 300. Projection component 306 enables a projection of images onto curved display 102 (e.g., from the interior of the curved display). It may be realized, for instance, as a projector of light in the visible spectrum and a wide-angle lens. Detection component 308 enables one or more touch contacts by at least one member 106 on curved display 102 to be detected. Member(s) 106 may be, by way of example but not limitation, a finger, multiple fingers, a hand, multiple hands, one or more palms, some combination thereof, and so forth. Members 106 may originate from the same person or from different people.

Detection component 308 is adapted to detect when and where member 106 touches/contacts curved display 102. Detection component 308 may be realized, for instance, as a set of infrared (IR)-tuned light emitting diodes (LEDs) that emanate into and/or towards curved display 102 along with an IR detector that detects when the IR light is reflected back from curved display 102. The IR light may be reflected back from curved display 102 to detection component 308 by, for example, a touch of member 106. Detection component 308 is adapted to detect the location or locations of the touch or touches by member 106 on curved display 102. Moreover, detection component 308 may be capable of detecting a size of the touch (e.g., a finger versus a palm) by member 106.

These detections may be provided to detection unit 314 of processing unit 310 for analysis to facilitate interaction with device 300 via touches on curved display 102.

Processing unit 310 may be realized, for example, with one or more processors and at least one memory. In an example operation, detection unit 314 provides locations and/or sizes of detected touch contacts to interaction unit 302. Interaction unit 302 is to enable UI interactions with device 300 via curved display 102. By way of example only, detection unit 314 may detect whether a finger-sized or a palm-sized touch input is occurring at curved display 102 by detecting a size of the touch input and comparing the size of the detected touch input to a predetermined size threshold. Interaction unit 302 can then implement a UI feature based on whether the detected touch input is finger-sized or palm-sized.

Interaction unit 302 sends display commands for manipulating UI elements and other display items to projection unit 312. Projection unit 312 may control what images are projected onto curved display 102 by projection component 306. By way of example, interaction unit 302 may implement one or more of the embodiments described further herein. These embodiments are described (i) generally by way of an example flow diagram with reference to FIG. 4 and (ii) more specifically with reference to FIG. 5. Example embodiments are described in greater detail with reference to FIGS. 6A-7B.

Figure 4:
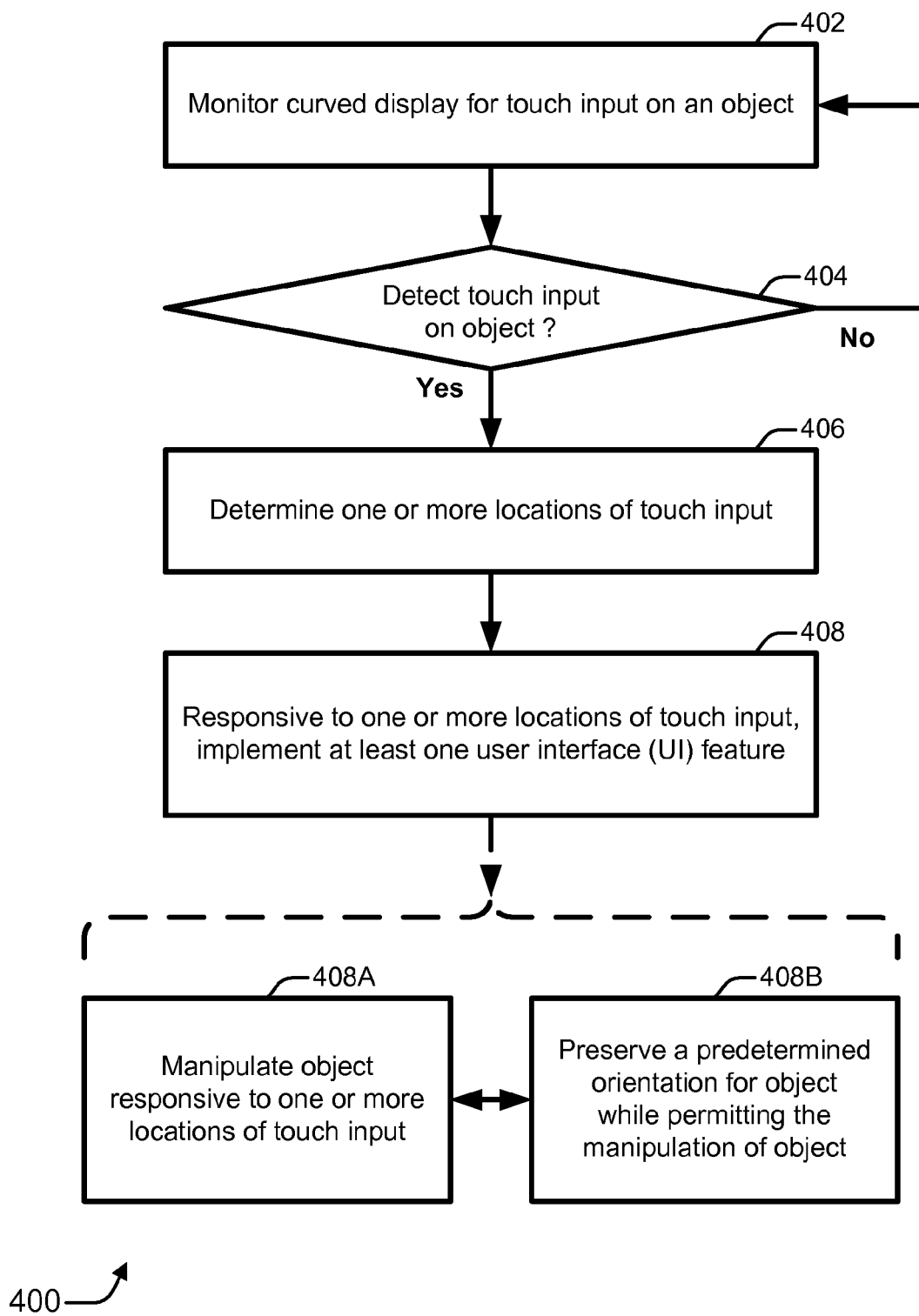
FIG. 4 is a flow diagram that illustrates an example of a method for touch interaction with a curved display.

FIG. 4 is a flow diagram 400 that illustrates an example of a method for touch interaction with a curved display. Flow diagram 400 includes six blocks 402-408, 408A, and 408B. Implementations of flow diagram 400 may be realized, for example, as processor-executable instructions and/or as part of processing unit 310 (of FIG. 3), including at least partially by a projection unit 312, a detection unit 314, and/or an interaction unit 302. Example embodiments for implementing flow diagram 400 are described below with reference to the elements of FIGS. 1 and 3.

Figure 8:
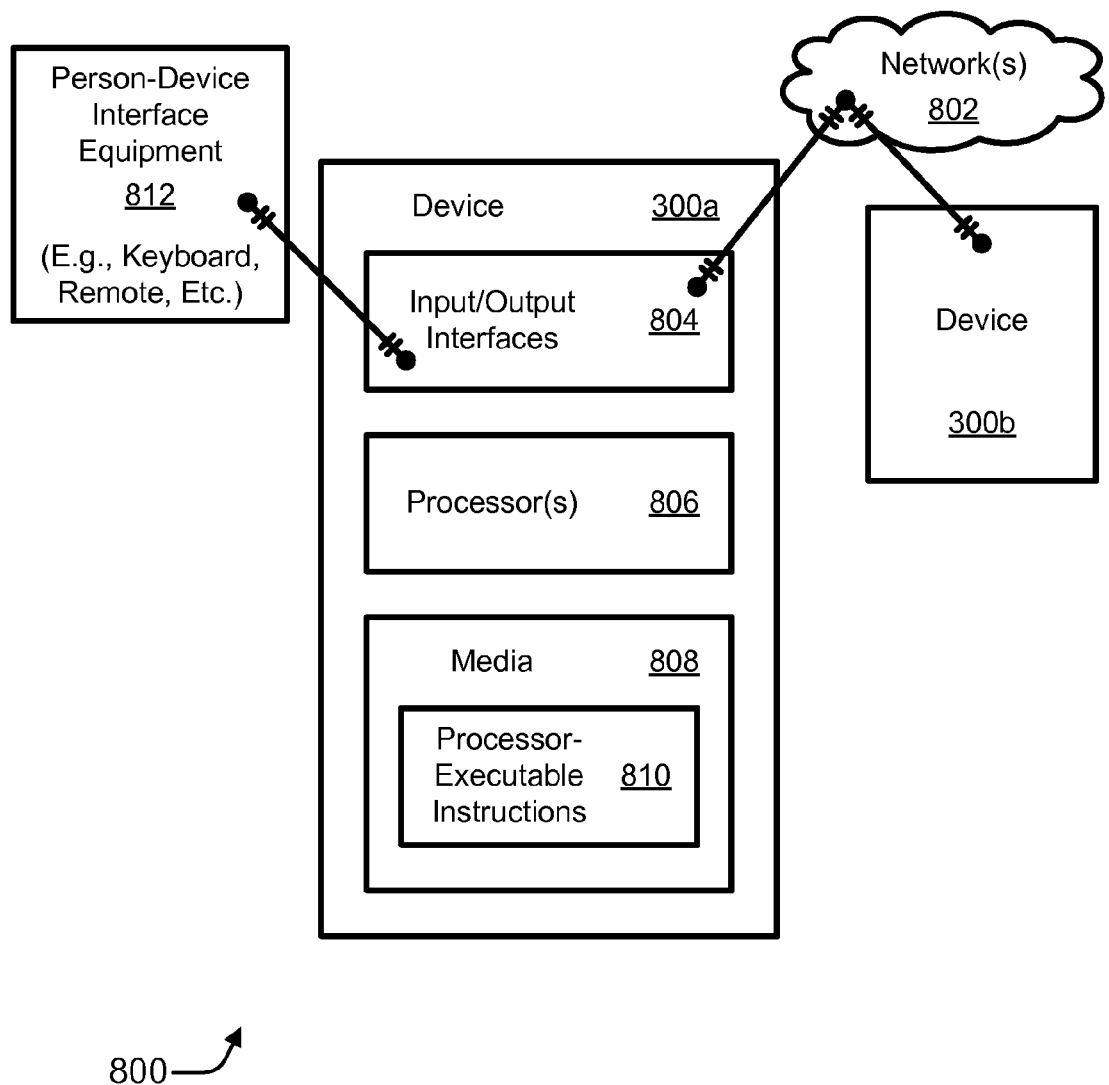
FIG. 8 is a block diagram illustrating example devices that may be used to implement embodiments for touch interaction with a curved display.

The acts of flow diagram 400 (and those of the other flow diagrams) that are described herein may be performed in many different environments and with a variety of different devices, such as by one or more processing devices (e.g., of FIG. 8). The orders in which the methods are described are not intended to be construed as limiting, and any number of the described blocks can be combined, augmented, rearranged, and/or omitted to implement a respective method, or an alternative method that is equivalent thereto. Although specific elements of certain other FIGS. are referenced in the description of the flow diagrams, the methods thereof may be performed with alternative elements.

For example embodiments, at block 402, a curved display is monitored for touch input on an object. For example, a curved display 102 may be monitored by detection component 308 and/or detection unit 314 for touch input on an object 104. At block 404, it is determined if at least one touch input on an object is detected. For example, detection unit 314 may monitor curved display 102 to detect touch input on object 104 by one or more members 106. If no touch is detected, then the monitoring continues (at block 402).

If, on the other hand, touch input on an object is detected (at block 404), then at block 406 one or more locations of the touch input are determined. For example, the location(s) of touch input(s) by member(s) 106 on object 104 of curved display 102 may be determined. These determinations may entail ascertaining a size of the touch input (e.g., finger versus palm), ascertaining a number of touch inputs (e.g., number of fingers, palms, people, etc.) on the curved display, tracking movement(s) of the touch input, monitoring a duration of a touch input, some combination thereof, and so forth.

At block 408, at least one UI feature is implemented responsive to the one or more locations of touch input. For example, at least one UI approach (e.g., mechanism and/or technique) may be implemented by interaction unit 302 responsive to the determined location(s) of the touch input. Example UI approaches are described generally herein below with particular reference to FIG. 5. Additional example embodiments are described more specifically with reference to FIGS. 6A-7B. Example UI approaches include those that involve preserving predetermined orientations for objects. Relatively general acts for implementing block 408 are described below with reference to blocks 408A and 408B.

Hence, the acts of block 408 may be implemented, for example, by the acts of blocks 408A and 408B. At block 408A, the object is manipulated responsive to the determined one or more locations of touch input. At block 408B, a predetermined orientation is preserved for the object while manipulation of the object is permitted. As is described further herein below, the preservation of the predetermined orientation may be accomplished relatively continuously during the manipulation (e.g., in accordance with an object behavioral auto-rotation feature) or when the manipulation ceases (e.g., in accordance with a tether behavioral feature).

FIG. 5 is a block diagram of example units 502 and 504 of an interaction unit 302 (of FIG. 3). As illustrated, interaction unit 302 includes an object behavioral auto-rotation unit 502 and a tether behavioral unit 504. Each of these units is capable of implementing at least one UI feature. These features relate to preserving a predetermined orientation for an object while permitting it to be manipulated.

In an example embodiment with regard to object behavioral auto-rotation unit 502, a predetermined or home orientation is utilized to maintain objects in a user-friendly orientation. A home orientation may be, for instance, a top orientation (e.g., a north pole for a spherical or hemispherical display). As objects (e.g., pictures, videos, images, windows, etc.) are moved around a curved display, object behavioral auto-rotation unit 502 maintains the objects in accordance with the predetermined orientation. The predetermined orientation may be programmed into the device or user selectable.

Thus, a picture, diagram, text, or similar may be maintained in an orientation such that a user or users can view it conveniently. The orientation may be maintained on a "continuous" basis. For example, the orientation of an object may be adjusted after each pixel of movement, at a given frequency/interval, and so forth. Example mechanisms and techniques for object behavioral auto-rotation unit 502 are described further herein below with particular reference to FIGS. 6A and 6B.

In an example embodiment with regard to tether behavioral unit 504, at least one tether axis is created to establish a predetermined or default orientation. With a tether axis, an object may be manipulated (e.g., moved, sized, twisted, etc.) by touch. When the touch ceases, tether behavioral unit 504 causes the object to return to the predetermined orientation. The return to the predetermined orientation may be an instantaneous change, a snap-back to the predetermined orientation, a relatively slow smooth continuous movement back to the predetermined orientation, and so forth.

The tether axis may be a latitude axis, a longitude axis, or both a longitude and a latitude axis (e.g., using terminology appropriate for a spherical-shaped curved display). With a longitude-only tether, for example, upon cessation of object manipulation, changes to an object's rotation around a north-south pole are permitted to remain, but other manipulations are rolled-back to restore the default orientation. Example mechanisms and techniques for tether behavioral unit 504 are described further herein below with particular reference to FIGS. 7A and 7B.

Object Behavioral Auto-Rotation Unit

As described herein above with particular reference to FIG. 2, dragging an object around a curved display can often leave the object in an awkward orientation. Consequently, the view-ability of objects may typically be increased when a drag of an object is followed by a local rotation to adjust the object's orientation. The visual change is usually all the more noticeable with longer drags. For example, the dragging of an object over the top of a spherical/hemispherical display to show it to a collaborator results in an "up-side down" orientation unless an auto-rotation procedure is performed. Hence, collaboration in particular may be facilitated by an auto-rotation behavior that continuously orients objects with respect to the top of a curved display.

Figure 6A:
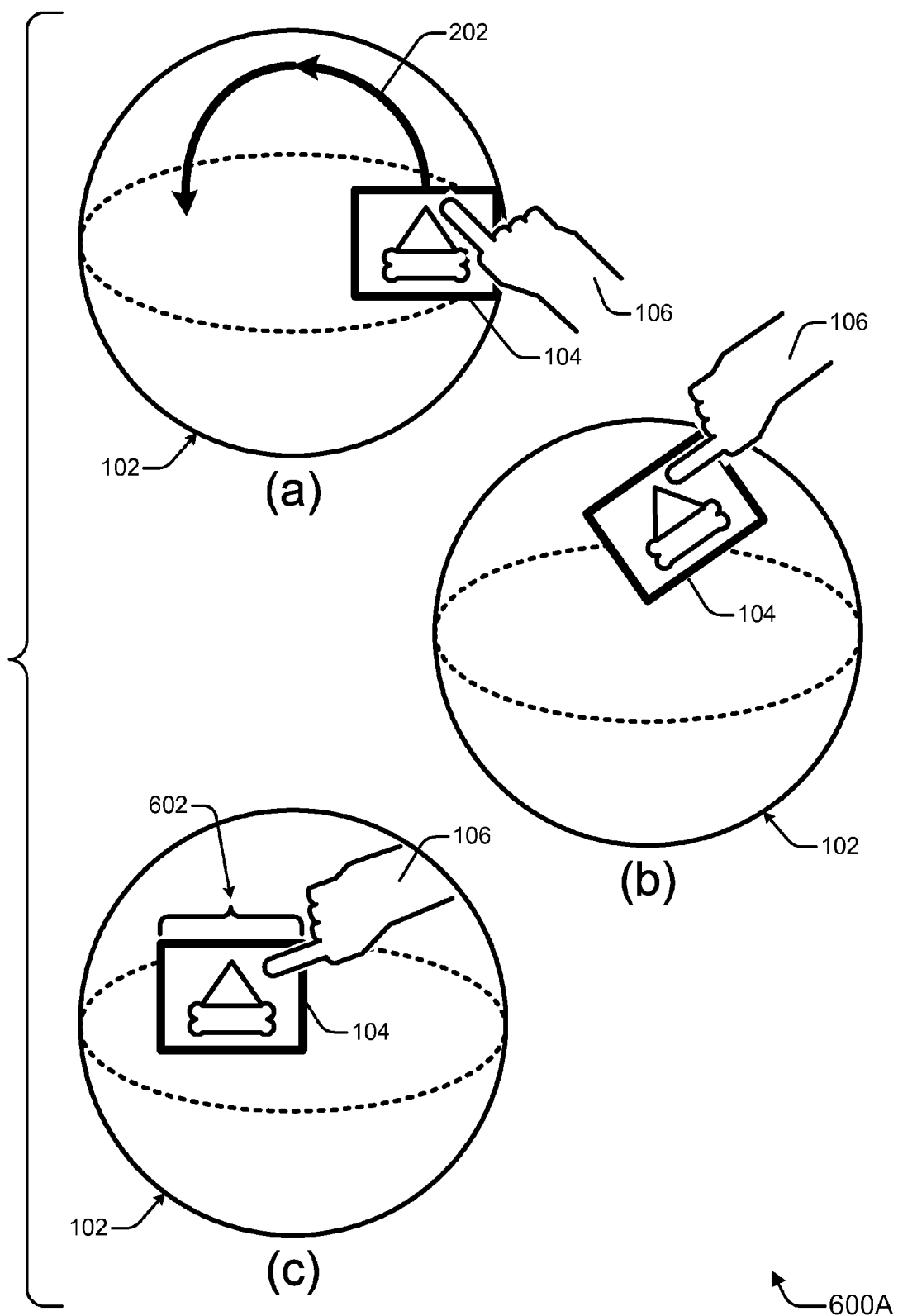
FIG. 6A illustrates an example mechanism for an object behavioral auto-rotation unit.

FIG. 6A illustrates an example mechanism 600A for an object behavioral auto-rotation unit. FIG. 6A has three portions: portion (a), which is the top third of the figure; portion (b), which is the middle third of the figure; and portion (c), which is the bottom third of the figure. As illustrated, object behavioral auto-rotation mechanism 600A includes a curved display 102, an object 104, a member 106, a path 202, and an orientation 602.

Path 202 is shown in portion (a). Path 202 represents a path over which object 104 is dragged by member 106. Member 106 touches object 104 and drags it up a first side toward the top of curved display 102 and then down a second side of curved display 102. Portion (b) shows object 104 during the dragging along path 202 as it "ascends" the first side. Portion (c) shows object 104 at the end of the dragging along path 202.

For example embodiments, orientation 602 is indicated in portion (c). Orientation 602 matches a predetermined orientation due to the auto-rotation behavior applied to object 104. This predetermined orientation may correspond, for instance, to a "natural" orientation (e.g., a right-side-up orientation) that facilitates comfortable viewing for users. For example, the predetermined orientation may be set such that orientation 602 of object 104 is level or flat. As shown, this predetermined orientation corresponds to a north pole of the spherical curved display 102.

In other words, when an object behavioral auto-rotation feature is activated on a, e.g., spherical curved display 102, each object is automatically oriented so that the top of the object continuously points to the top of the sphere. As noted herein above, the top (e.g., the "north pole") is a natural orientation landmark that provides an omni-directional "up" cue. This auto-rotation behavior simplifies collaborations by effectively eliminating the need for explicit user-controlled local rotations. If an object is placed "exactly" on the top of the sphere, it may remain in its current orientation until a user drags it away.

Because object behavioral auto-rotation unit 502 continuously orients all objects with respect to the top, a user is able to pass a picture or other object to a collaborator on the other side. The image automatically adjusts its local orientation so that viewing is correct. This behavior appears natural to viewers because it results in the "correct" view. The auto-rotation feature can, however, be deactivated globally or on an object-by-object basis so that users are empowered to locally rotate an object as desired.

Figure 6B:
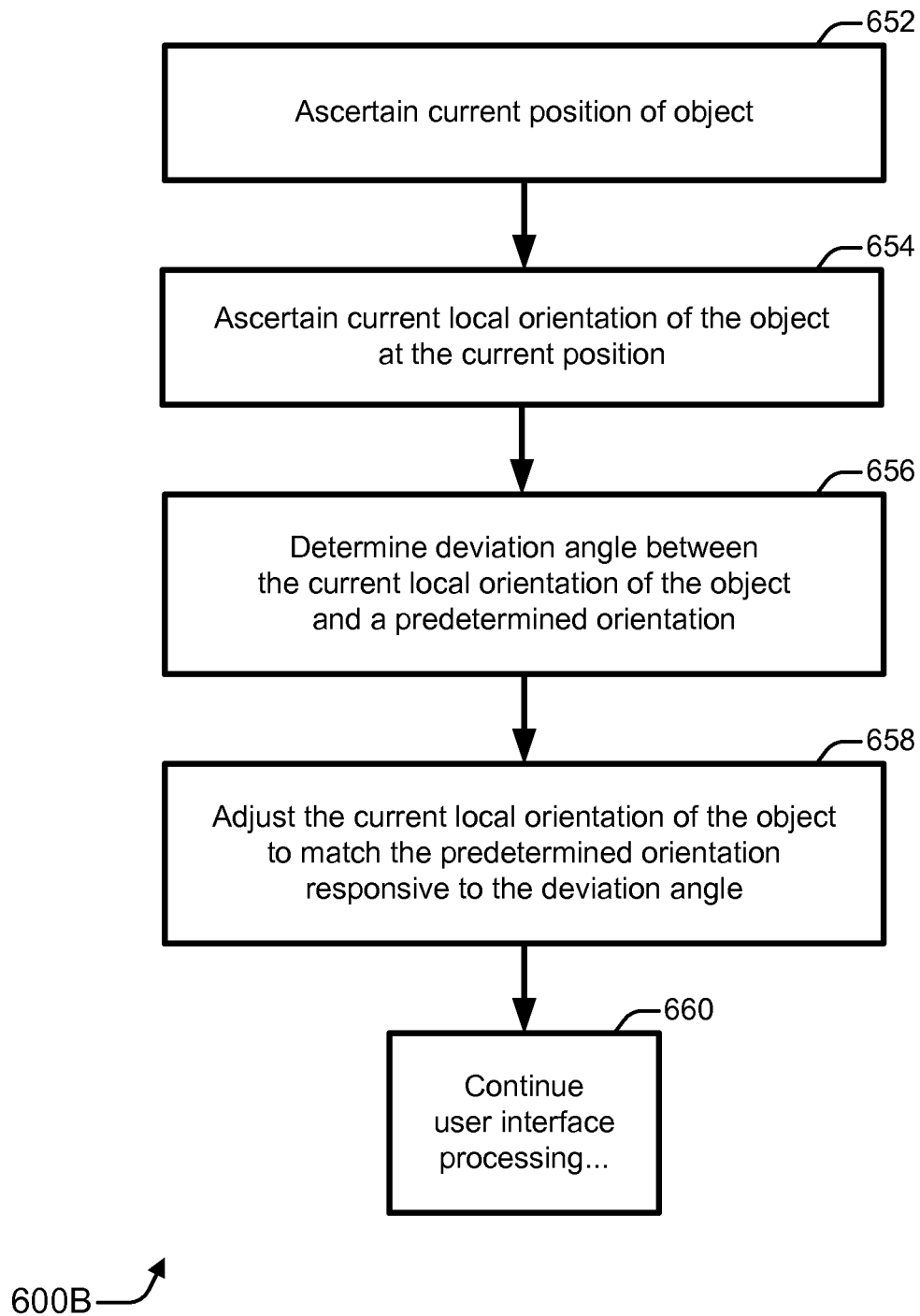
FIG. 6B is a flow diagram that illustrates an example of a method for an object behavioral auto-rotation technique.

FIG. 6B is a flow diagram 600B that illustrates an example of a method for an object behavioral auto-rotation technique. Flow diagram 600B includes five blocks 652-660. The acts of flow diagram 600B may be performed "continuously". In other words, they may be performed after each manipulation that changes the position of an object on a curved display. For example, they may be performed each time after an object is dragged a predetermined number of pixels (e.g., one or more pixels). Alternatively, they may be performed at a predetermined frequency or interval of time, especially for each object that is currently being touched.

For example embodiments, at block 652, a current position of an object is ascertained. At block 654, a current local orientation of the object at the current position is ascertained. At block 656, a deviation angle between the current local orientation of the object and a predetermined orientation is determined.

At block 658, the current local orientation of the object is adjusted to match the predetermined orientation responsive to the deviation angle. For example, the negative of the deviation angle may be applied to the current local orientation of the object to auto-rotate it with respect to the predetermined orientation (e.g., the top of a curved display). The adjustment of the object's orientation (e.g., an application of the deviation angle) may be instantaneously implemented, may be applied in a smooth transition, may be implemented sufficiently frequently and quickly that it is or that at least it appears to be constant, and so forth. At block 660, UI processing continues. The continued UI processing may be for any of the features described herein or other UI-related processing.

Tether Behavior Unit

Omni-directional images—such as cylindrical maps of any spherical object or 360° panoramic images—are well suited for presentation on a curved display, such as a sphere. A spherical curved display may enable user interaction with such data by acting as a spherical omni-directional data viewer. For example, the following types of data may be displayed: a live-stream from an omni-directional video conferencing camera, omni-directional images of a cityscape captured by a camera mounted on a car roof, images of the Earth's surface, and so forth.

The fact that omni-directional data can span much or even the entirety of the display surface presents interesting implications for multi-user, multi-touch collaboration scenarios. Allowing more than one person to touch the data often results in conflict (e.g., multiple users may try to spin a globe image in multiple different directions at the same time). Thus, interactions may be restricted to a single touch (e.g., the first touch is assigned control), but such a scheme is often confusing to other users. Alternatively, users may be responsible for socially mitigating these kinds of situations, such as by taking turns or allowing one person to lead the interaction.

In short, a single user or multiple users may be permitted to manipulate an image. Thus, one or more users may be allowed to rotate and inspect omni-directional data. Unfortunately, this often results in data being left in an orientation that is potentially confusing to others. To mitigate this problem, a tether behavior may be implemented. With a tether behavioral feature, a user can freely manipulate an object having omni-directional data. Upon the release of touch contacts, the object returns to a "natural" orientation (e.g., a horizontal state).

Figure 7A:
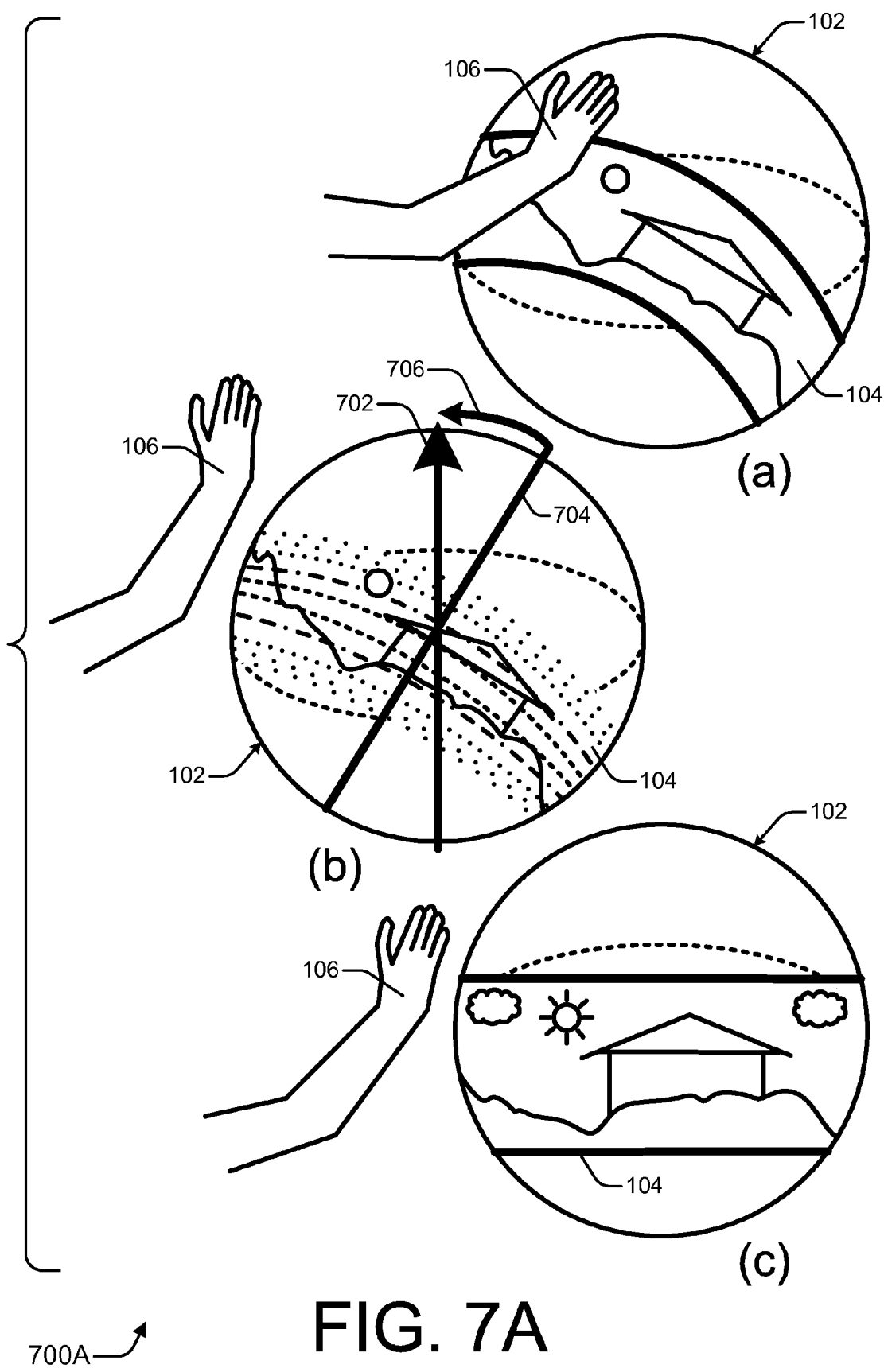
FIG. 7A illustrates an example mechanism for a tether behavioral unit.

FIG. 7A illustrates an example mechanism 700A for a tether behavioral unit. FIG. 7A has three portions: portion (a), which is the top third of the figure; portion (b), which is the middle third of the figure; and portion (c), which is the bottom third of the figure. As illustrated, tether behavioral mechanism 700A includes a curved display 102, an object 104, a member 106, a tether axis 702, a current axis 704, and an axis adjustment 706.

Portion (a) shows member 106 manipulating object 104. Object 104 has, by way of example only, omni-directional data. Object 104 may be moved up and down, side to side, twisted, combinations thereof, and so forth. In other words, the user is enabled to freely manipulate the omni-directional data of object 104.

As shown at portion (b), for example embodiments with the tether behavioral feature activated, the omni-directional data of object 104 returns to a natural orientation upon release of the touch contact by member 106. During the operation of curved display 102 as shown with portion (b), the omni-directional data of object 104 is in motion as it returns to its natural orientation.

There is at least one predetermined tether position, or tether axis 702, for curved display 102. Because many omni-directional images have a clear up direction, the top of the spherical curved display 102 may be used as the tether axis 702. However, any arbitrary axis can be specified as the tether axis. When member 106 releases the touch contact(s) on object 104, object 104 has a current axis 704.

To return object 104 to its natural orientation, an axis adjustment 706 is performed to adjust current axis 704 until it matches tether axis 702. The adjustment may be performed substantially instantaneously, may be performed by smoothly transitioning from one axis to the other, and so forth. After axis adjustment 706 is performed, the omni-directional data of object 104 is returned to its natural orientation, as is shown in portion (c).

Figure 7B:
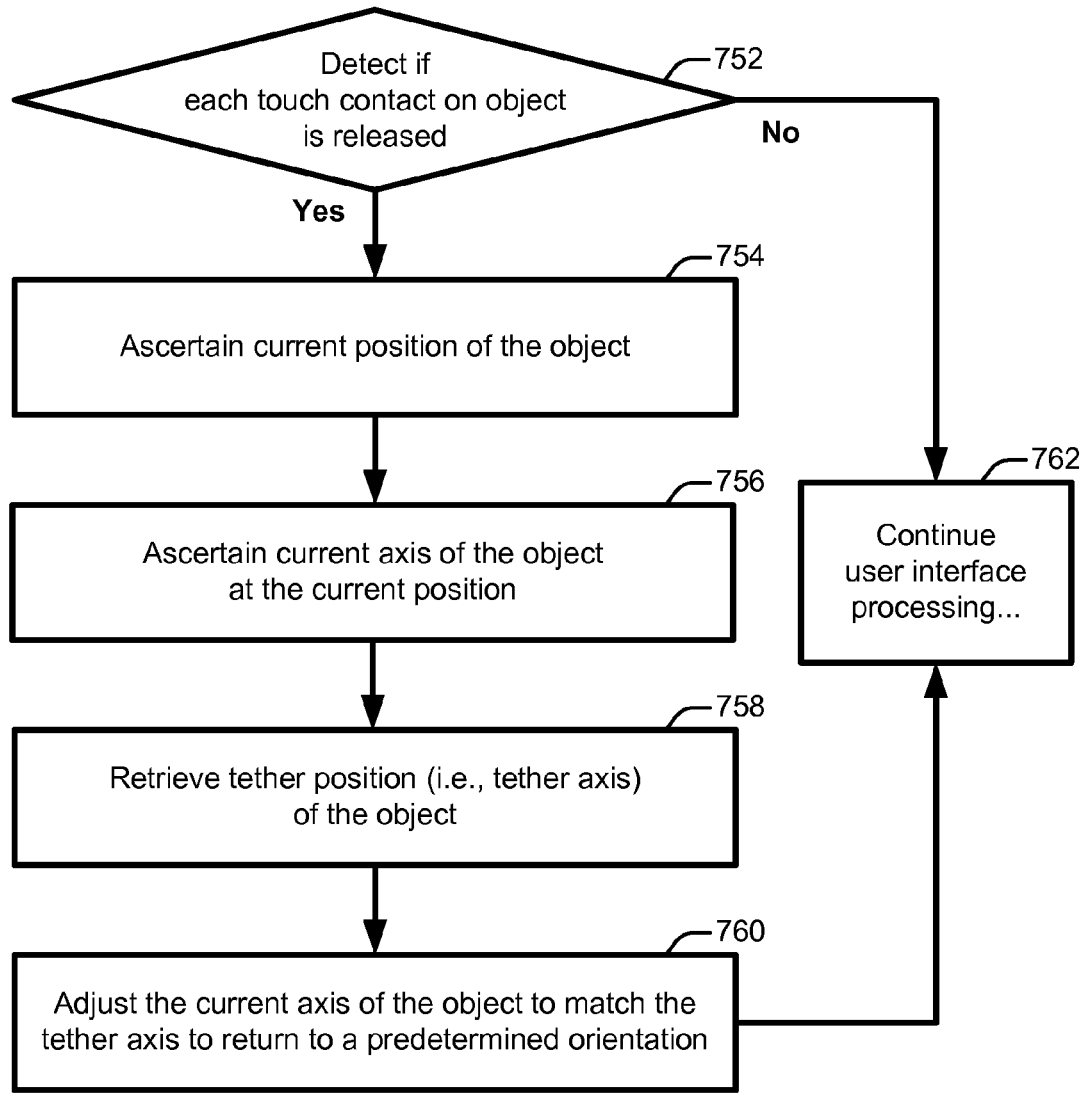
FIG. 7B is a flow diagram that illustrates an example of a method for a tether behavioral technique.

FIG. 7B is a flow diagram 700B that illustrates an example of a method for a tether behavioral technique. Flow diagram 700B includes six blocks 752-762. The method is implicated when user touch contacts via one or more members 106 are present on an object 104. For example embodiments, at block 752, it is detected if each touch contact on an object is released. If not, then user interface processing may continue at block 762. For example, user manipulation of the object through touch may continue.

If, on the other hand, it is detected (at block 752) that each touch contact on the object has been released, then at block 754 the current position of the object is ascertained. For example, if the touch contacts from member(s) 106 are detected to be released from object 104, then the current position of object 104 on curved display 102 may be ascertained.

At block 756, the current axis of the object at the current position is ascertained. For example, current axis 704 of object 104 at the current position may be ascertained. At block 758, a tether position (i.e., a tether axis) of the object is retrieved. For example, a tether axis 702 for object 104 may be retrieved from a stored memory location. Each respective object 104 may have its own respective tether axis 702, or one or more objects 104 may share a tether axis 702. There may also be a single tether axis 702 for each object 104 that is presented on curved display 102.

At block 760, the current axis of the object is adjusted to match the tether axis to return the object to a predetermined orientation. For example, current axis 704 of object 104 may be adjusted to match the retrieved tether axis 702 via an axis adjustment 706. This adjustment effectively returns object 104 to a predetermined orientation, such as its "natural" orientation (e.g., a right-side-up orientation). The adjustment may be accomplished by smoothly animating the object between the current position and the tether position, by "instantaneously" snapping the object back to its tether position, and so forth. After the tether adjustment (at block 760), UI processing is continued at block 762.

Thus, with an example tether behavioral feature embodiment, rotational movements, left-right movements, and up-down movements may be retained while the angular movements are "rolled-back" after touch contacts are ceased. However, as noted above, more than one tether axis may be implemented at one time. With two or more tether axis, fewer directional movements may be retained while more are "rolled-back" during the adjustment operation. Additionally for an example implementation, even with a single tether axis, rotational movements may be retained while others are removed during the axis adjustment.

The illustrated examples shown for object behavioral auto-rotation mechanisms and techniques focus on a rectangular bordered object. The illustrated examples shown for tether behavioral mechanisms and techniques focus on an omni-directional object. However, an object behavioral auto-rotation feature may be applied to an omni-directional or other type of object. Similarly, a tether behavioral feature may be applied to a rectangular bordered object or other type of object. Generally, they are each applicable to objects having different types of content.

FIG. 8 is a block diagram 800 illustrating example devices 300 that may be used to implement embodiments for touch interaction with a curved display. As illustrated, block diagram 800 includes two devices 300a and 300b, person-device interface equipment 812, and one or more network(s) 802. As explicitly shown with device 300a, each device 300 may include one or more input/output interfaces 804, at least one processor 806, and one or more media 808. Media 808 may include processor-executable instructions 810.

For example embodiments, device 300 may represent any processing-capable device. Example devices 300 include personal or server computers, hand-held or other portable electronics, entertainment appliances, media presentation or collaborative tools, network components, some combination thereof, and so forth. Device 300a and device 300b may communicate over network(s) 802. Network(s) 802 may be, by way of example but not limitation, an internet, an intranet, an Ethernet, a public network, a private network, a cable network, a digital subscriber line (DSL) network, a telephone network, a wireless network, some combination thereof, and so forth. Person-device interface equipment 812 may be a keyboard/keypad, a touch screen, a remote, a mouse or other graphical pointing device, a curved display 102 (e.g., of FIGS. 1 and 3), a display component 304 (e.g., of FIG. 3), and so forth. Person-device interface equipment 812 may be integrated with or separate from device 300a.

I/O interfaces 804 may include (i) a network interface for monitoring and/or communicating across network 802, (ii) a display device interface for displaying information on a display screen, (iii) one or more person-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) person-device interfaces include those that communicate by wire or wirelessly to person-device interface equipment 812. A given interface (e.g., for curved display 102) may function as both a display device interface and a person-device interface.

Processor 806 may be implemented using any applicable processing-capable technology, and one may be realized as a general-purpose or a special-purpose processor. Examples include a central processing unit (CPU), a microprocessor, a controller, a graphics processing unit (GPU), a derivative or combination thereof, and so forth. Media 808 may be any available media that is included as part of and/or is accessible by device 300. It includes volatile and non-volatile media, removable and non-removable media, storage and transmission media (e.g., wireless or wired communication channels), hard-coded logic media, combinations thereof, and so forth. Media 808 is tangible media when it is embodied as a manufacture and/or as a composition of matter.

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 300. Processor-executable instructions 810 may be embodied as software, firmware, hardware, fixed logic circuitry, some combination thereof, and so forth.

Thus, realizations for touch interaction with a curved display may be described in the general context of processor-executable instructions. Processor-executable instructions may include routines, programs, applications, coding, modules, protocols, objects, components, metadata and definitions thereof, data structures, APIs, etc. that perform and/or enable particular tasks and/or implement particular abstract data types. Processor-executable instructions may be located in separate storage media, executed by different processors, and/or propagated over or extant on various transmission media.

As specifically illustrated, media 808 comprises at least processor-executable instructions 810. Processor-executable instructions 810 may comprise, for example, processing unit 310 (of FIG. 3) or any portion thereof (e.g., interaction unit 302). Generally, processor-executable instructions 810, when executed by processor 806, enable device 300 to perform the various functions described herein. Such functions include, by way of example but not limitation, those that are illustrated in flow diagrams 400, 600B, and 700B (of FIGS. 4, 6B, and 7B) and those pertaining to the features and mechanisms that are illustrated in the various block diagrams, as well as combinations thereof, and so forth.

The devices, acts, features, functions, methods, modules, data structures, techniques, components, etc. of FIGS. 1 and 3-8 are illustrated in diagrams that are divided into multiple blocks and other elements. However, the order, interconnections, interrelationships, layout, etc. in which FIGS. 1 and 3-8 are described and/or shown are not intended to be construed as a limitation, and any number of the blocks and/or other elements can be modified, combined, rearranged, augmented, omitted, etc. in many manners to implement one or more systems, methods, devices, media, apparatuses, arrangements, etc. for touch interaction with a curved display.

Although systems, methods, devices, media, apparatuses, arrangements, and other example embodiments have been described in language specific to structural, logical, algorithmic, and/or functional features, it is to be understood that the invention defined in the appended claims is not necessarily limited to the specific features or acts described above. Rather, the specific features and acts described above are disclosed as example forms of implementing the claimed invention.

What is claimed is:

1. A device comprising:
a curved display;
a hardware processor; and
processor-readable instructions which, when executed by the hardware processor, configure the hardware processor to implement a detection unit and an interaction unit, wherein:
the detection unit is adapted to:
monitor the curved display to detect a touch input on a curved exterior portion of the curved display, the touch input identifying an object shown on the curved exterior portion of the curved display, wherein the curved exterior portion of the curved display at least partially encloses a space, and
determine one or more locations of the touch input on the curved exterior portion of the curved display; and
the interaction unit is adapted to:
enable the object to be freely manipulated on the curved exterior portion of the curved display, including changing orientation of the object relative to a pole of an axis that extends through the space that is at least partially enclosed by the curved exterior portion of the curved display, and
cause the object to return to a predetermined orientation relative to the pole of the axis that extends through the space that is at least partially enclosed by the curved exterior portion of the curved display when a user ceases manipulating of the object.

2. The device of claim 1, wherein the axis is a tether axis and the interaction unit is adapted to return the object to the predetermined orientation by:
ascertaining a current position of the object on the curved display;
ascertaining a current axis of the object; and
adjusting the current axis of the object to match the tether axis.

3. The device of claim 1, wherein the interaction unit is adapted to cause the object to return to the predetermined orientation instantaneously.

4. The device of claim 1, wherein the curved display is a spherical display.

5. The device of claim 4, wherein the axis is a north-south axis.

6. The device of claim 5, wherein the predetermined orientation comprises a right-side-up orientation defined by a north pole located on the curved exterior portion of the spherical display.

7. The device of claim 1, wherein the object comprises a photo, a video, a web page, a textual document other than a web page, a spreadsheet, or a window.

8. A device comprising:
a curved display;
a hardware processor; and
processor-readable instructions which, when executed by the hardware processor, configure the hardware processor to implement a detection unit and an interaction unit, wherein:
the detection unit is adapted to:
monitor the curved display to detect a touch input on a curved exterior portion of the curved display, the touch input identifying an object shown on the curved exterior portion of the curved display, wherein the curved exterior portion of the curved display at least partially encloses a space, and
determine one or more locations of the touch input on the curved exterior portion of the curved display; and
the interaction unit is adapted to:
manipulate the object shown on the curved exterior portion of the curved display responsive to the one or more locations of the touch input on the curved exterior portion of the curved display, and
preserve a predetermined orientation for the object relative to a pole of an axis that extends through the space that is at least partially enclosed by the curved exterior portion of the curved display,
wherein the interaction unit is adapted to preserve the predetermined orientation continuously at a given frequency or interval as the object is manipulated on the curved exterior portion of the curved display.

9. The device of claim 8, wherein the curved display is a spherical display.

10. The device of claim 9, wherein the pole is a north pole of the spherical display and the predetermined orientation of the object is toward the north pole.

11. The device of claim 8, wherein the interaction unit is adapted to:
ascertain a current position of the object on the curved display;
ascertain a current local orientation of the object at the current position relative to the pole of the axis;
determine a deviation angle between the current local orientation of the object and the predetermined orientation; and
adjust the current local orientation of the object to match the predetermined orientation based on the deviation angle.

12. The device of claim 11, wherein the interaction unit is adapted to adjust the current local orientation by applying a negative of the deviation angle to the current local orientation to auto-rotate the object.

13. The device of claim 8, wherein the axis is a north-south axis.

14. The device of claim 13, wherein the curved display is spherical or hemispherical.

15. A device comprising:
a curved display;
a hardware processor; and
processor-readable instructions which, when executed by the hardware processor, configure the hardware processor to implement a detection unit and an interaction unit, wherein:
the detection unit is adapted to:
monitor the curved display to detect a touch input on a curved exterior portion of the curved display, the touch input identifying an object shown on the curved exterior portion of the curved display, wherein the curved exterior portion of the curved display at least partially encloses a space, and
determine one or more locations of the touch input on the curved exterior portion of the curved display; and the interaction unit is adapted to:

manipulate the object shown on the curved exterior portion of the curved display responsive to the one or more locations of the touch input on the curved exterior portion of the curved display, and preserve a predetermined orientation for the object relative to a pole of an axis that extends through the space that is at least partially enclosed by the curved exterior portion of the curved display, wherein the interaction unit is adapted to preserve the predetermined orientation by continuously adjusting orientation of the object after a predetermined number of pixels of movement of the object shown on the curved exterior portion of the curved display, the predetermined number of pixels of movement being one or more.

16. The device of claim 15, wherein the predetermined number of pixels is one.

17. The device of claim 15, wherein the predetermined number of pixels is more than one.

18. The device of claim 15, wherein the interaction unit is adapted to preserve the predetermined orientation as the object is manipulated while being touched.

19. The device of claim 15, wherein the curved display is a spherical display.

20. The device of claim 19, wherein the pole is a north pole of the spherical display and the predetermined orientation of the object is toward the north pole.

21. A method performed by a hardware processor, the method comprising:

monitoring a curved display to detect a touch input on a curved exterior portion of the curved display, the touch input identifying an object shown on the curved exterior portion of the curved display, wherein the curved exterior portion of the curved display at least partially encloses a space;

determining one or more locations of the touch input on the curved exterior portion of the curved display;

manipulating the object shown on the curved exterior portion of the curved display responsive to the touch input, including changing orientation of the object relative to a pole of an axis that extends through the space that is at least partially enclosed by the curved exterior portion of the curved display; and causing the object to return to a predetermined orientation relative to the pole of the axis that extends through the space that is at least partially enclosed by the curved exterior portion of the curved display when a user ceases manipulating of the object.

22. A method performed by a hardware processor, the method comprising:

monitoring a curved display to detect a touch input on a curved exterior portion of the curved display, the touch input identifying an object shown on the curved exterior portion of the curved display, wherein the curved exterior portion of the curved display at least partially encloses a space;

determining one or more locations of the touch input on the curved exterior portion of the curved display;

manipulating the object shown on the curved exterior portion of the curved display responsive to the one or more locations of the touch input on the curved exterior portion of the curved display; and preserving a predetermined orientation for the object relative to a pole of an axis that extends through the space that is at least partially enclosed by the curved exterior portion of the curved display, wherein predetermined orientation is preserved by:

adjusting orientation of the object at a given frequency or interval as the object is manipulated on the curved exterior portion of the curved display, or adjusting the orientation of the object after a predetermined number of pixels of movement of the object shown on the curved exterior portion of the curved display, the predetermined number of pixels of movement being one or more.

* * * * *